United States Patent [19]
Arai et al.

[11] Patent Number: 5,410,612
[45] Date of Patent: Apr. 25, 1995

[54] APPARATUS AND METHOD FOR RECOGNIZING CHARACTERS

[75] Inventors: Tsunekazu Arai, Tama; Shigeru Mizuhara, Tokyo; Yoshihiro Oguchi, Kawasaki; Kazutoshi Shimada, Yokosuka; Kiyoshi Kaneko, Yokohama; Katsuyuki Kobayashi, Yokohama; Masaki Tokioka, Yokohama, all of Japan

[73] Assignee: Canon Kabushiki Kaisha, Tokyo, Japan

[21] Appl. No.: 899,698

[22] Filed: Jun. 16, 1992

[30] Foreign Application Priority Data

Jun. 19, 1991 [JP] Japan ................................. 3-147398

[51] Int. Cl.6 .............................................. G06K 9/00
[52] U.S. Cl. ........................................ 382/13; 382/57
[58] Field of Search ...................................... 382/13, 57

[56] References Cited
U.S. PATENT DOCUMENTS 4,680,804  7/1987  Kuzunuki et al. ..................... 382/13
4,860,372  8/1989  Kuzunuki et al. ..................... 382/13
5,150,424  9/1992  Aguro et al. .......................... 382/13

FOREIGN PATENT DOCUMENTS 0254561   1/1988  European Pat. Off. ..
3629104   3/1987  Germany .
56-143091 11/1981  Japan .

Primary Examiner—Leo H. Boudreau
Attorney, Agent, or Firm—Fitzpatrick, Cella, Harper & Scinto

[57] ABSTRACT

An apparatus and method for recognizing characters in image information includes inputting image coordinate data corresponding to the handwritten image, displaying a calligraphic image on the basis of the image coordinate data, recognizing characters in the image coordinate data, and erasing the calligraphic image and displaying recognized characters recognized in the recognizing step in the event that a recognized character is a predetermined character such as a period (".").

58 Claims, 4 Drawing Sheets

APPARATUS AND METHOD FOR RECOGNIZING CHARACTERS

BACKGROUND OF THE INVENTION

1. Field of the Invention

The present invention relates to an apparatus and method for recognizing handwritten characters which are input in real time and for displaying the result of the recognition.

2. Description of the Related Art

Hitherto, there has been a system for recognizing handwritten characters which accepts input handwritten character information as one character unit when handwritten character information is input. For example, in coordinate input devices such as a resistance film digitizer, character recognition is initiated upon activation of the recognition switch.

In the prior art, there has been a system which performs an input/recognition/display operation repeatedly for each character. That is, the system performs recognition for one character of handwritten character information when the system recognizes that one character of handwritten character information is input and then displays the result of the recognition.

However, the above-described prior art must be instructed as to when to initiate recognition of input handwritten characters, and this instruction is given by operating a switch each time a handwritten character is input. Thus, the inputting of character information is frequently stopped, thereby decreasing efficiency.

In addition, in the above-described prior art, since trace information formed of coordinate data of input handwritten characters is displayed, the data of one input character is recognized when it is recognized that the inputting of one character of this handwritten character is finished, and the character pattern of the character obtained as a result of the recognition is changed to the input handwritten character data and displayed, inputting of handwritten characters is stopped because the display is changed frequently, which is inconvenient.

SUMMARY OF THE INVENTION

The present invention provides a method and apparatus for character recognition in which there is no need for frequent stopping of inputting handwritten characters; instead, operations for changing the display are collectively performed, thereby decreasing display screen flicker caused by display changing.

According to one aspect of the present invention, a method and apparatus for recognizing characters in image information includes outputting a displayable image signal on the basis of the image information, recognizing character information on the basis of the image information, detecting whether recognized character information consists of specific character information, and outputting the result of character recognition in accordance with the result of the determining step.

According to another aspect of the present invention, an apparatus and method for recognizing characters in image information includes inputting image coordinate data corresponding to the handwritten image, displaying a calligraphic image on the basis of the image coordinate data, recognizing characters in the image coordinate data, and erasing the calligraphic image and displaying recognized characters recognized in said recognizing step in the event that a recognized character is a punctuation mark such as a period (".").

Objectives and advantages in addition to those discussed above shall be apparent to those skilled in the art from the description of the preferred embodiment of the invention which follows. In the description, reference is made to the accompanying drawings, which form a part hereof, and which illustrate an example of the invention. Such example, however, is not exhaustive of the various embodiments of the invention, and therefore reference is made to the appended claims for determining the scope of the invention.

DETAILED DESCRIPTION OF THE PREFERRED EMBODIMENT

Figure 1:
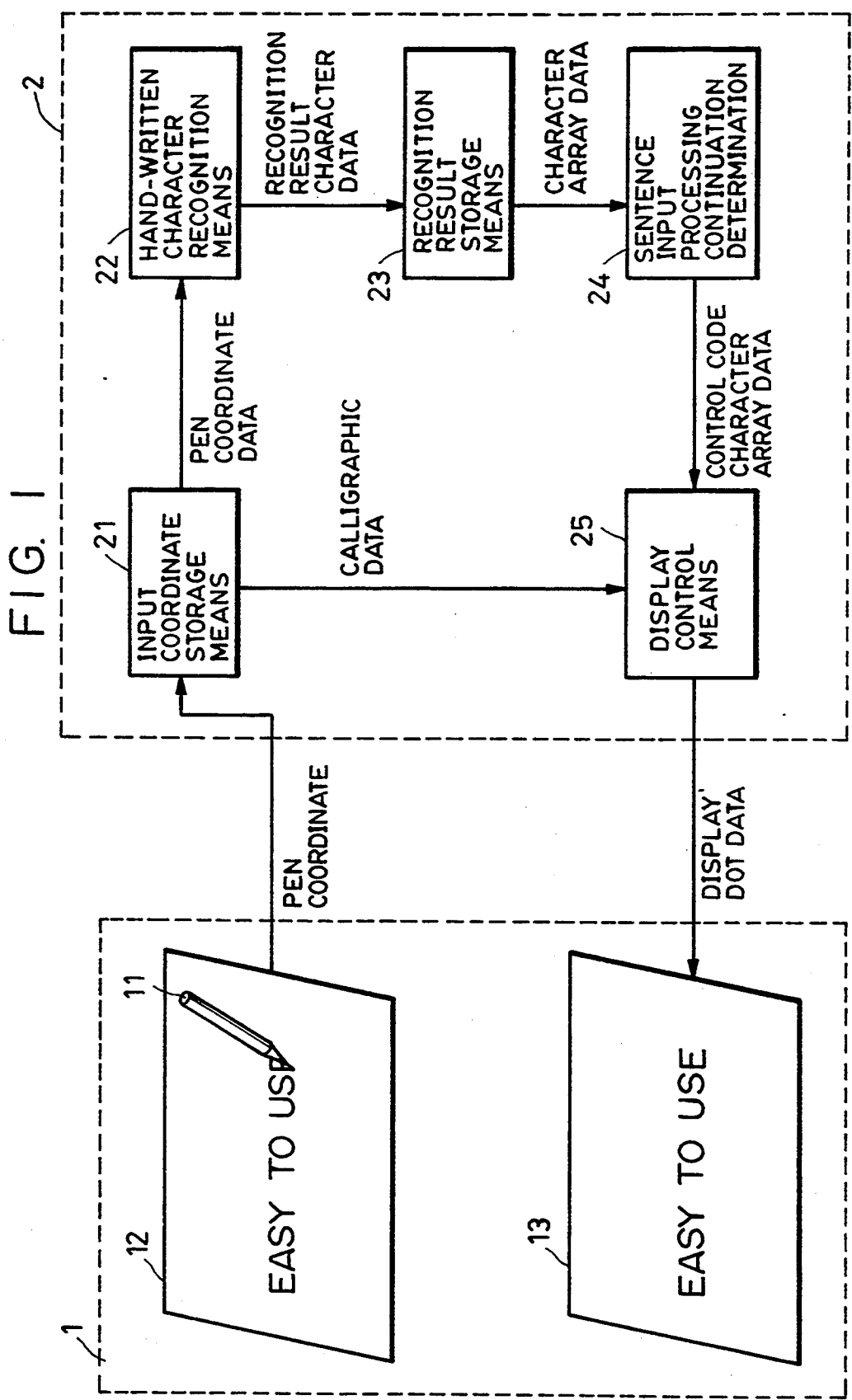
FIG. 1 is a block diagram illustrating the construction of an embodiment of the present invention.

FIG. 1 is a view illustrating the construction of a character recognition apparatus according to an embodiment of the present invention. Reference numeral 1 denotes an input/output block which is formed of an input section 12, an input pen 11 and a liquid-crystal display section 13. Reference numeral 2 denotes a processing block which is formed of an input coordinate storage means 21, a handwritten character recognition means 22, a recognition result storage means 23, a sentence input processing continuation determination means 24, and a display control means 25.

The input section 12 is an input panel in which electrodes are arrayed in the vertical and horizontal directions, and to which coordinate data is input when it is depressed with the input pen 11. Preferably, an input area 10 of the input section 12 is preallocated for inputting one character only. The coordinate data is sent to the input coordinate storage means 21. The input coordinate storage means 21 receives and stores the coordinate data of the input pen 11 sent from the input section 12. The input character coordinate data is sent to the handwritten character recognition means 22 and the display control means 25. The handwritten character recognition means 22 recognizes characters on the basis of a conventional commonly-used recognition method, such as a pattern matching method, and sends code data of the recognized character to the recognition result storage means 23. The recognition result storage means 23 stores the code data of the recognized character sent from the handwritten character recognition means 22 and sends the character string data to the sentence input processing continuation determination means 24. The sentence input processing continuation determination means 24 sends a control code for clearing the display of the calligraphic input character and detecting the aforesaid character string code data from the display control means 25 when the sentence input processing continuation determination means 24 determines that inputting of one sentence is terminated on the basis of character string data sent from the recognition result storage means 23. The display control means 25 creates calligraphic display dot coordinate data on the basis of the input coordinate data sent from the input coordinate storage means 21, sends out data indicating that the liquid-crystal display section 13 should be cleared on the basis of a control code sent from the sentence input processing continuation determination means 24, and sends out the display dot coordinates of the character string data which are the result of the recognition obtained based on the character string data. The commonly used liquid-crystal display section 13 displays characters on the basis of the display dot coordinate data sent from the display control means 25.

Figure 2:
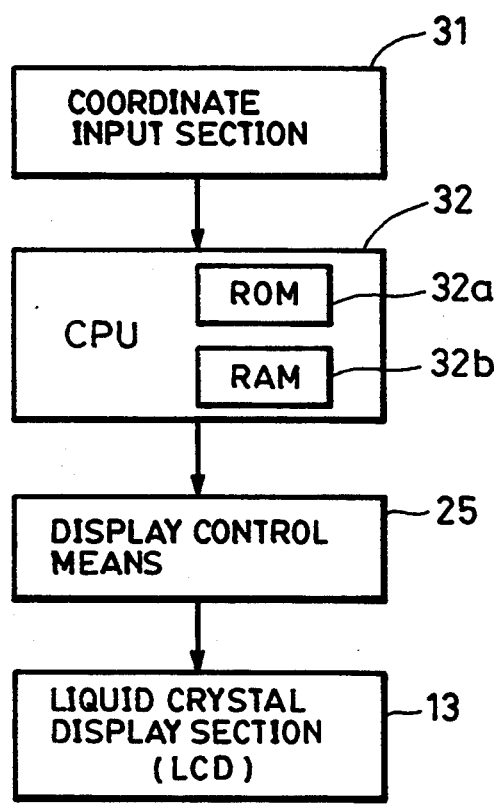
FIG. 2 is a block diagram of the embodiment of the present invention.

FIG. 2 is a block diagram of the embodiment of the present invention. Reference numeral 31 denotes a co-ordinate input section, which is an input panel having electrodes arrayed in the vertical and horizontal directions, and into which coordinate data is input when the input pen 11 is depressed. The coordinate data is sent to a central processing unit 32 (hereinafter referred to as a CPU). The CPU 32 has a ROM 32a for storing programs by means of which operations are performed in accordance with the flowchart shown in FIG. 3, and a RAM 32b for storing data which must be processed. The CPU 32 stores coordinate values inputted from the coordinate input section in the RAM 32b by using the processing procedure stored in the ROM 32a, outputs the input coordinate values, performs a matching with a character pattern dictionary having coordinate values stored in a ROM, and outputs character codes as a result of the recognition.

Figure 3:
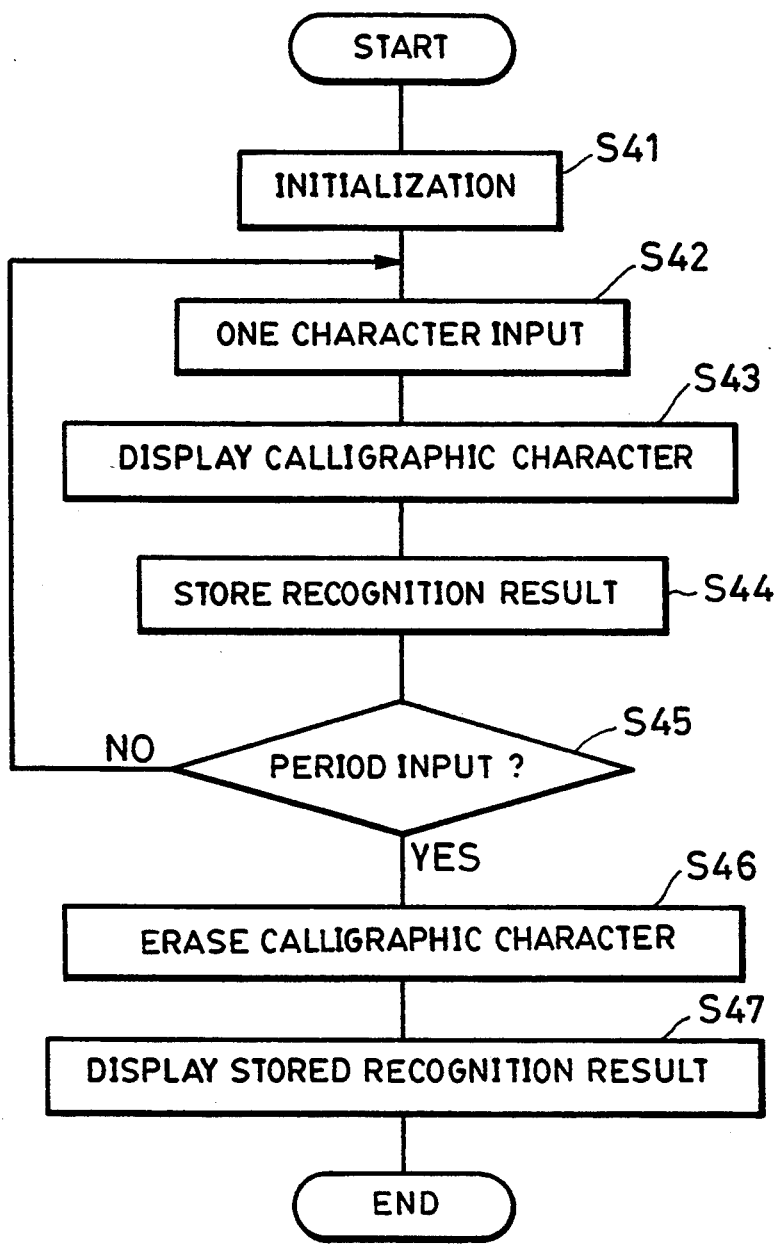
FIG. 3 is a flowchart which illustrates an operation sequence.
Figure 4:
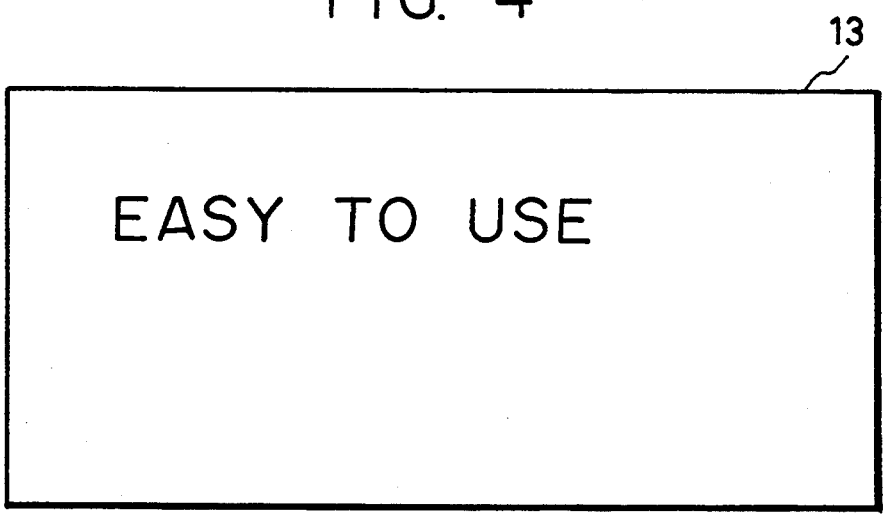
FIG. 4 shows an example of a calligraphic specimen display of an input character.
Figure 5:
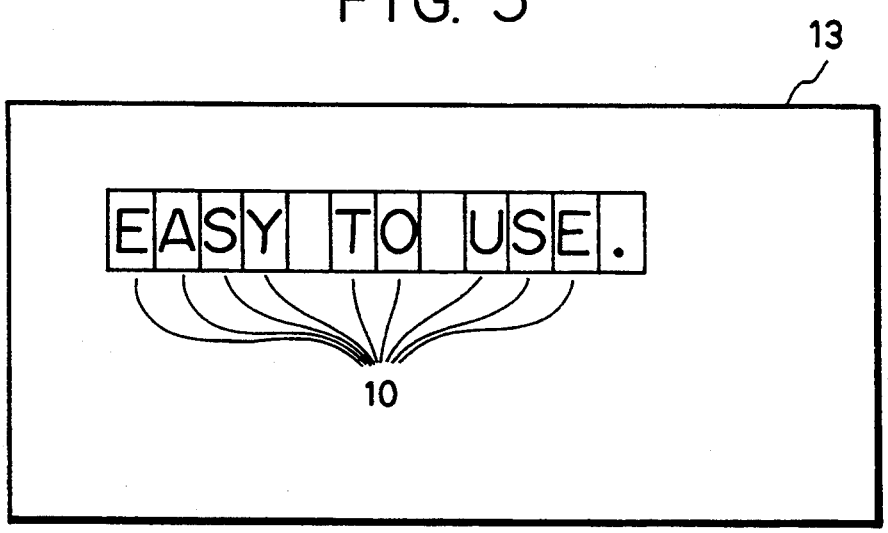
FIG. 5 shows an example of the result of the recognition of the input character.

FIG. 3 is a flowchart which illustrates an operation sequence stored in the ROM 32a according to the present invention. FIG. 4 shows an example of characters input to the input section 12, which are displayed as they are originally input. FIG. 5 shows an example of the result of the recognition of the input character in FIG. 4.

The operation of the apparatus having the above-described construction of the present invention will now be explained with reference to the flowchart in FIG. 3.

Character recognition is usually performed when the apparatus is in the character input mode. When characters are written by depressing the input pen 11 in the input section 12, the information of the coordinates in the input section 12 are input to the processing block 2 in order that the information on the coordinates can be recognized as being a character. In step S41, the work area of the RAM 32b is initialized and a recognition result storage buffer in the recognition result storage means 23 is initialized.

In step S42, it is determined that the inputting of character data has been terminated upon moving the input pen 11 into another input area 10 of input section 12. Recognition is performed on the basis of a conventional commonly used recognition method, such as a pattern matching method, when one character is written by depressing the input pen 11 in the input section 12, and a character code is determined based on the recognition result.

In step S43, the calligraphic specimen of the input character is displayed on the liquid-crystal display section 13. An instruction to write a straight line formed by connecting the coordinate points of each stroke of a character input from the coordinate input section 31 is sent to the display control means 25. Thereafter, the display control means 25 sends out display dot coordinate data of the straight line and the liquid-crystal display section 13 displays the display dot coordinate data. As a result, the calligraphic specimen of the input character is displayed. The display coordinates are stored in a calligraphic specimen display storage buffer in a specific area of the RAM 32b.

In step S44, the recognition result is stored in the recognition result storage means 23. Information, such as character codes or character positions obtained as a result of the recognition performed in step S42, is stored in a recognition result storage buffer in a specific area of the RAM 32b.

In step S45, an operation for determining whether inputting of one sentence is terminated is performed by the sentence input processing continuation determination means 24. In this regard, it is generally determined that the inputting of one sentence is terminated when a period (.) is input. When the input character is recognized as a period in step S42, the CPU 32 determines that the inputting of one sentence is terminated, and the process proceeds to step S46. When a character other than a period is recognized, it is determined that the inputting of one sentence is continuing, and the process proceeds to step S42, at which step the next character is input.

In step S46, an operation for clearing the display of the calligraphic specimen of one sentence inputted thus far is performed. Data to clear the display is sent to the display control means 25. The data clears the display of the calligraphic specimen of one sentence displayed in step S43 on the basis of the storage display coordinate data of the calligraphic specimen display storage buffer in a specific area of the RAM 32b, and the data is stored in step S43, causing the calligraphic specimen display on the liquid-crystal display section 13 to be cleared.

In step S47, the result of the recognition of one sentence inputted thus far is displayed. The character code data of the recognition result storage buffer in a specific area of the RAM 32b, stored in step S44, is sent to the display control means 25, causing the recognition result to be displayed on the liquid-crystal display section 13.

Thus, since the operations described above are performed in the above-described way, the display of the calligraphic specimens of characters, the input of which is in progress, as shown in FIG. 4, is changed to display the recognition result shown in FIG. 5.

An operation for determining whether or not the inputting of one sentence is terminated on the basis of the input of a period has been explained above. There is a case in which it can be considered that the inputting of one sentence is terminated on the basis of a recognition other than that described above, and the recognition may be displayed. That is, the above case is one in which no inputting has occurred for five minutes or longer. In this case, an operation for measuring the time during which the inputting is discontinued may be performed so that, when no inputting has been performed for a given time, a determination is made as to whether or not the steps for clearing a display beginning with step S46 should be performed.

In a case where the present invention is applied to a handwriting electronic pocket notebook, when an operation other than inputting of a character is performed (an input of something other than a character is made), it is desirable that an operation for determining whether the inputting be discontinued and steps starting with step S46 should be performed. Even though only an operation for recognizing characters one by one in step S42 has been explained, an operation for collectively recognizing characters may be performed since the recognition result can be displayed collectively in step S47.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included with the spirit and scope of the claims.

What is claimed is:

1. A method for recognizing characters in image information, comprising the steps of:
   outputting a displayable image signal on the basis of the information;
   recognizing character information on the basis of the image information;
   determining whether the recognized character information consists of a punctuation mark; and
   outputting the result of character recognition in a case where it has been determined in said determining step that the recognized character information consists of a punctuation mark and, in a case where it has not been determined in said determining step that the recognized character information consists of a punctuation mark, and, in a case where it has not been determined in said determining step that the recognized character information consists of a punctuation mark, not outputting the result of character recognition, thereby resulting in the reduction of screen display flicker.

2. A method for recognizing characters in image information according to claim 1, wherein the image information is coordinate information for a handwritten image.

3. A method for recognizing characters in image according to claim 1, wherein the predetermined character is a period (.).

4. A method for recognizing characters in image information according to claim 1, further comprising the steps of inputting the image information, wherein the step of recognizing character information is initiated in response to the determination that inputting of one character of image information is complete.

5. A method for recognizing characters in image information according to claim 4, wherein an input area for each character is preallocated in an input portion for the coordinate information, and wherein termination of the inputting of one character of input coordinate information is determined upon moving an input of coordinate information from one input area to another input area.

6. A method for recognizing characters in image information according to claim 1, wherein the result of the character recognition is converted to image information corresponding to the character recognition result and displayed.

7. A method for recognizing characters in image information according to claim 1, wherein the character recognition result to be output is a prestored character pattern.

8. A method for displaying characters in a handwritten image comprising the steps of:
   inputting image coordinate data corresponding to the handwritten image;
   displaying a calligraphic image on the basis of the image coordinate data;
   recognizing characters in the image coordinate data; and
   erasing the calligraphic image and displaying recognized characters recognized in said recognizing step in a case where a recognized character is a punctuation mark and, in a case where it has not been determined that the recognized character consists of a punctuation mark, not erasing the calligraphic image or displaying the recognized characters, thereby resulting in the reduction of screen display flicker.

9. A method for displaying characters in a handwritten image according to claim 8, wherein said step of displaying a calligraphic image includes the step of connecting coordinate points in the image coordinate data.

10. A method for displaying characters in a handwritten image according to claim 8, wherein the predetermined character is a period (.).

11. A method for displaying characters in a handwritten image according to claim 8, wherein what is to be displayed in said erasing and displaying step is a prestored character pattern.

12. An apparatus for recognizing characters in image information, comprising:
    image signal output means for outputting a displayable image signal on the basis of the image information;
    character recognition means for recognizing character information on the basis of the image information;
    determination means for determining whether the character information recognized by the character recognition means consists of a punctuation mark; and
    character information output means for outputting stored character information in a case where it has been determined by the determination means that the recognized character information consists of a punctuation mark and, in a case where the determination means has not determined that the recognized character information consists of a punctuation mark, not outputting the result of character recognition, thereby resulting in the reduction of screen display flicker.

13. An apparatus for recognizing characters in image information according to claim 12, wherein the image information is coordinate information for a handwritten image.

14. An apparatus for recognizing characters in image information according to claim 12, wherein the predetermined character determined by the determination means is a period (.).

15. An apparatus for recognizing characters in image information according to claim 12, further comprising input means for inputting image information, wherein the recognition by the recognition means is initiated in response to a determination that inputting of one character of the coordinate information is terminated.

16. An apparatus for recognizing characters in image information according to claim 15, wherein said input means includes a preallocated input area for coordinate information for each character, and wherein termination of inputting one character of the input coordinate information is determined upon moving the input of coordinate information from one input area to another input area.

17. An apparatus for recognizing characters in image information according to claim 12, wherein output from the character information output means is converted to image information corresponding to the character recognition result, output from the image information output means, and displayed.

18. An apparatus for recognizing characters in image information according to claim 12, wherein the character information output from the character information output means is a prestored character pattern.

19. An apparatus for displaying characters in a handwritten image comprising:
   inputting means for inputting image coordinate data corresponding to the handwritten image;
   displaying means for displaying a calligraphic image on the basis of the image coordinate data;
   recognizing means for recognizing characters in the image coordinate data; and
   erasing means for erasing the calligraphic image and displaying recognized characters in a case where a recognized character is a punctuation mark and, in a case where it has not been determined that the recognized character consists of a punctuation mark, not erasing the calligraphic image or displaying the recognized characters, thereby resulting in the reduction of screen display flicker.

20. An apparatus for displaying characters in a handwritten image according to claim 19, wherein said displaying means includes connecting means for connecting coordinate points in the image coordinate data.

21. An apparatus for displaying characters in a handwritten image according to claim 19, wherein the specific character information is a period (.).

22. An apparatus for displaying characters in a handwritten image according to claim 19, wherein the character recognition result to be output is a prestored character pattern.

23. A method for recognizing characters in image information, comprising the steps of:
   inputting coordinate data of a plurality of character patterns;
   displaying the character patterns on the basis of the coordinate data;
   recognizing character information on the basis of the coordinate data;
   determining whether the recognized character information consists of a punctuation mark; and
   outputting the result of character recognition in a case where it has been determined in said determining step that the recognized character information consists of a punctuation mark and, in a case where it has not been determined in said determining step that the recognized character information consists of a punctuation mark, not outputting the result of character recognition, thereby resulting in the reduction of screen display flicker.

24. A method for recognizing characters in image information according to claim 23, wherein the image information is coordinate information for a handwritten image.

25. A method for recognizing characters in image information according to claim 23, wherein the predetermined character is a period (.).

26. A method for recognizing characters in image information according to claim 23, further comprising the steps of inputting the image information, wherein the step of recognizing character information is initiated in response to the determination that inputting of one character of image information is complete.

27. A method for recognizing characters in image information according to claim 26, wherein an input area for each character is preallocated in an input portion for the coordinate information, and wherein termination of the inputting of one character of input coordinate information is determined upon moving an input of coordinate information from one input area to another input area.

28. A method for recognizing characters in image information according to claim 23, wherein the result of the character recognition is converted to image information corresponding to the character recognition result and displayed.

29. A method for recognizing characters in image information according to claim 23, wherein the character recognition result to be output is a prestored character pattern.

30. A method for recognizing characters in image information, comprising the steps of:
   providing a storing unit for storing a plurality of character data;
   inputting coordinate data of a character pattern;
   recognizing character data on the basis of the coordinate data;
   storing the recognized character data in said storing unit by adding it to said plurality of character data prestored therein;
   determining whether the recognized character data is a punctuation mark; and
   outputting said plurality of character data stored in said storing unit in a case where it has been determined that the recognized character data is a punctuation mark and, in a case where it has not been determined that the recognized character information is a punctuation mark, not outputting said plurality of character data stored in said storing unit, thereby resulting in the reduction of screen display flicker.

31. A method for recognizing characters in image information according to claim 30, wherein the image information is coordinate information for a handwritten image.

32. A method for recognizing characters in image information according to claim 30, wherein the predetermined character is a period (.).

33. A method for recognizing characters in image information according to claim 30, further comprising the steps of inputting the image information, wherein the step of recognizing character information is initiated in response to the determination that inputting of-one character of image information is complete.

34. A method for recognizing characters in image information according to claim 33, wherein an input area for each character is preallocated in an input portion for the coordinate information, and wherein termination of the inputting of one character of input coordinate information is determined upon moving an input of coordinate information from one input area to another input area.

35. A method for recognizing characters in image information according to claim 30, wherein the result of the character recognition is converted to image information corresponding to the character recognition result and displayed.

36. A method for recognizing characters in image information according to claim 30, wherein the character recognition result to be output is a prestored character pattern.

37. An apparatus for recognizing characters in image information, comprising:
   means for inputting coordinate data of a plurality of character patterns;
   means for displaying the character patterns on the basis of the coordinate data;
   means for recognizing character information on the basis of the coordinate data;
   means for determining whether the recognized character information consists of a punctuation mark; and
   means for outputting the result of character recognition in a case where it has been determined by said determining means that the recognized character information consists of a punctuation mark and, in a case where it has not been determined by said determining means that the recognized character information consists of a punctuation mark, not outputting the result of character recognition, thereby resulting in the reduction of screen display flicker.

38. An apparatus for recognizing characters in image information according to claim 37, wherein the image information is coordinate information for a handwritten image.

39. An apparatus for recognizing characters in image information according to claim 37, wherein the predetermined character is a period (.).

40. An apparatus for recognizing characters in image information according to claim 37, further comprising means for inputting the image information, wherein said recognizing means performs its recognition of character information in response to the determination that inputting of one character of image information is complete.

41. An apparatus for recognizing characters in image information according to claim 40, wherein an input area for each character is preallocated in an input portion for the coordinate information, and wherein termination of the inputting of one character of input coordinate information is determined upon moving an input of coordinate information from one input area to another input area.

42. An apparatus for recognizing characters in image information according to claim 37, wherein the result of the character recognition is converted to image information corresponding to the character recognition result and displayed.

43. An apparatus for recognizing characters in image information according to claim 37, wherein the character recognition result to be output is a prestored character pattern.

44. An apparatus for recognizing characters in image information, comprising:
   a storing unit for storing a plurality of character data;
   means for inputting coordinate data of a character pattern;
   means for recognizing character data on the basis of the coordinate data;
   means for storing the recognized character data in said storing unit by adding it to the plurality of character data prestored therein;
   means for determining whether the recognized character data is a punctuation mark; and
   means for outputting the plurality of character data stored in said storing unit in a case where it has been determined that the recognized character data is a punctuation mark and, in a case where it has not been determined that the recognized character information is a punctuation mark, not outputting the plurality of character data stored in said storing unit, thereby resulting in the reduction of screen display flicker.

45. An apparatus for recognizing characters in image information according to claim 44, wherein the image information is coordinate information for a handwritten image.

46. An apparatus for recognizing characters in image information according to claim 44, wherein the predetermined character is a period (.).

47. An apparatus for recognizing characters in image information according to claim 44, further comprising means for inputting the image information, wherein the recognizing of character information by said recognizing means is initiated in response to the determination that inputting of one character of image information is complete.

48. An apparatus for recognizing characters in image information according to claim 47, wherein an input area for each character is preallocated in an input portion for the coordinate information, and wherein termination of the inputting of one character of input coordinate information is determined upon moving an input of coordinate information from one input area to another input area.

49. An apparatus for recognizing characters in image information according to claim 44, wherein the result of the character recognition is converted to image information corresponding to the character recognition result and displayed.

50. An apparatus for recognizing characters in image information according to claim 44, wherein the character recognition result to be output is a prestored character pattern.

51. A method according to claim 1, wherein the punctuation mark is a punctuation mark that indicates the completion of a sentence or a partial sentence.

52. A method according to claim 8, wherein the punctuation mark is a punctuation mark that indicates the completion of a sentence or a partial sentence.

53. An apparatus according to claim 12, wherein the punctuation mark is a punctuation mark that indicates the completion of a sentence or a partial sentence.

54. An apparatus according to claim 19, wherein the punctuation mark is a punctuation mark that indicates the completion of a sentence or a partial sentence.

55. A method according to claim 23, wherein the punctuation mark is a punctuation mark that indicates the completion of a sentence or a partial sentence.

56. A method according to claim 30, wherein the punctuation mark is a punctuation mark that indicates the completion of a sentence or a partial sentence.

57. An apparatus according to claim 37, wherein the punctuation mark is a punctuation mark that indicates the completion of a sentence or a partial sentence.

58. An apparatus according to claim 44, wherein the punctuation mark is a punctuation mark that indicates the completion of a sentence or a partial sentence.

* * * * *

UNITED STATES PATENT AND TRADEMARK OFFICE
CERTIFICATE OF CORRECTION

PATENT NO. : 5,410,612
DATED : April 25, 1995
INVENTOR(S) : TSUNEKAZU ARAI, et al.

It is certified that error appears in the above-indentified patent and that said Letters Patent is hereby corrected as shown below:

COLUMN 5:

Line 27, "and, in a case where it has" should be deleted;
Lines 28 and 29 should be deleted;
Line 30, "punctuation mark," should be deleted; and
Line 37, "image" should read --image information--.

COLUMN 8:

Line 52, "of-one" should read --of one--.

Signed and Sealed this

Eighteenth Day of July, 1995

Attest:

BRUCE LEHMAN

Attesting Officer

Commissioner of Patents and Trademarks